United States Patent [19]

McKinlay et al.

[11] 4,009,434
[45] Feb. 22, 1977

[54] DIELECTRIC INDUCTION LOGGING SYSTEM FOR OBTAINING WATER AND RESIDUAL OIL SATURATION OF EARTH FORMATIONS

[75] Inventors: Philip F. McKinlay; Richard A. Meador, both of Houston, Tex.

[73] Assignee: Texaco Inc., New York, N.Y.

[22] Filed: Dec. 9, 1974

[21] Appl. No.: 530,798

[52] U.S. Cl. .................................................. 324/6
[51] Int. Cl.² ............................ G01V 3/10; G01V 3/18
[58] Field of Search ................................. 324/1, 6

[56] References Cited

UNITED STATES PATENTS

| | | | |
|---|---|---|---|
| 3,075,142 | 1/1963 | Albright et al. | 324/1 |
| 3,086,168 | 4/1963 | Buckner | 324/6 |
| 3,166,708 | 1/1965 | Millican | 324/1 |
| 3,259,836 | 7/1966 | Oshry | 324/6 |
| 3,551,797 | 12/1970 | Gouilloud et al. | 324/6 |
| 3,849,721 | 11/1974 | Calvert | 324/6 |

FOREIGN PATENTS OR APPLICATIONS

| | | | |
|---|---|---|---|
| 272,450 | 11/1970 | U.S.S.R. | 324/6 |

OTHER PUBLICATIONS

Antonov et al., *Two Frequency Dielectric Induction Logging with Two Sondes* Geol., Geofiz., 9, No. 4, pp. 94–101 (1968).
Daev, D.S. *Dielectric Induction Logging* Izv. Vyssh. Ucheb. Zaved., Geol. Razved. 8, No. 11, pp. 110–119 (1965).

*Primary Examiner*—Gerard R. Strecker
*Attorney, Agent, or Firm*—T. H. Whaley; C. G. Ries; William J. Beard

[57] ABSTRACT

Radio frequency electromagnetic fields are used to excite earth formations in the vicinity of a well borehole. The total field amplitude at a single coil receiver and at a dual coil receiver are detected and signals representative thereof are combined according to a predetermined relationship to obtain the relative permittivity and resistivity of the earth formations. By combining the measured permittivity with porosity measurements from another source according to predetermined relationships, the water saturation $S_w$ and residual oil saturation ROS may be determined and logged as a function of borehole depth.

17 Claims, 6 Drawing Figures

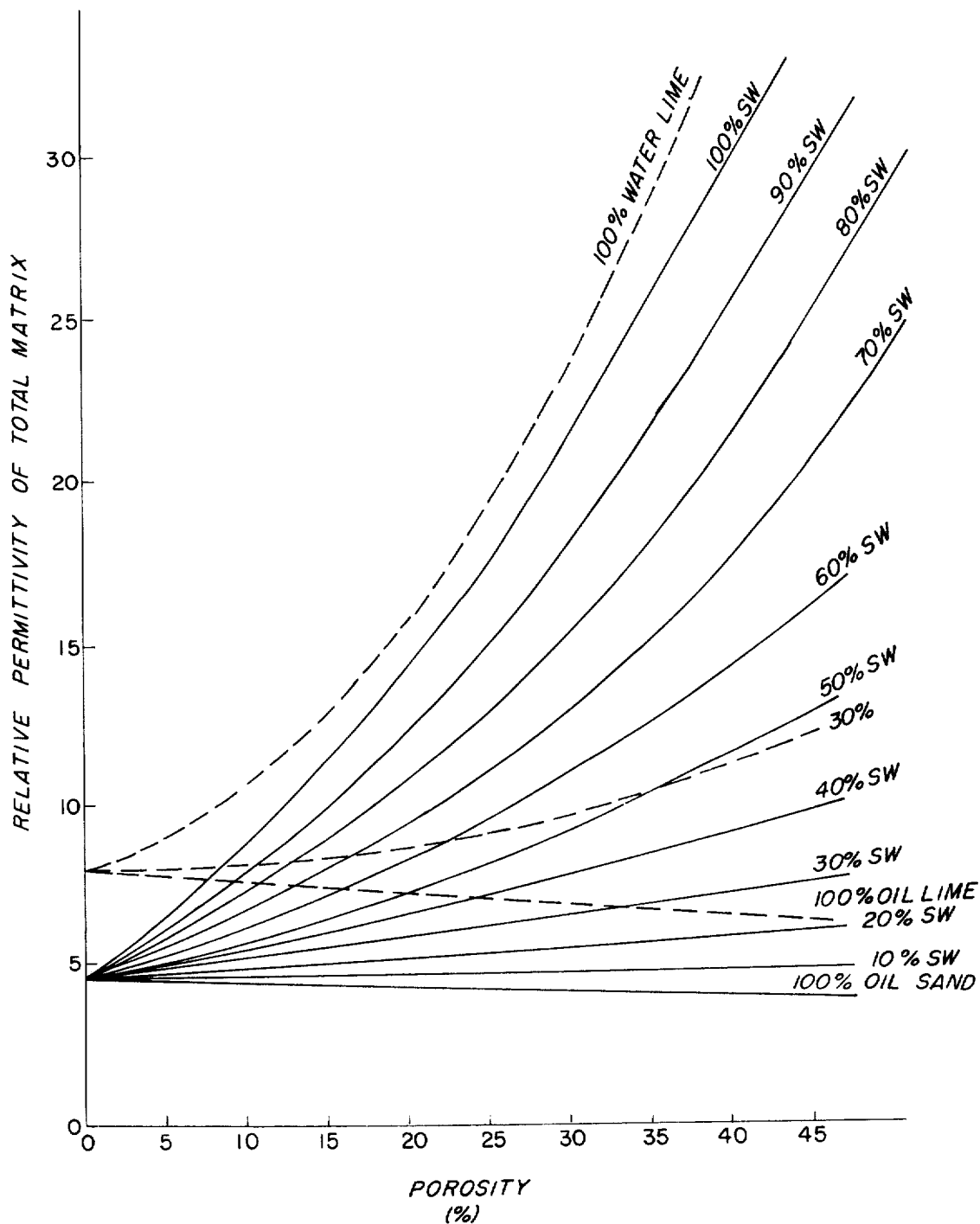

RESIDUAL OIL SATURATION (ROS)
SANDSTONE FORMATION

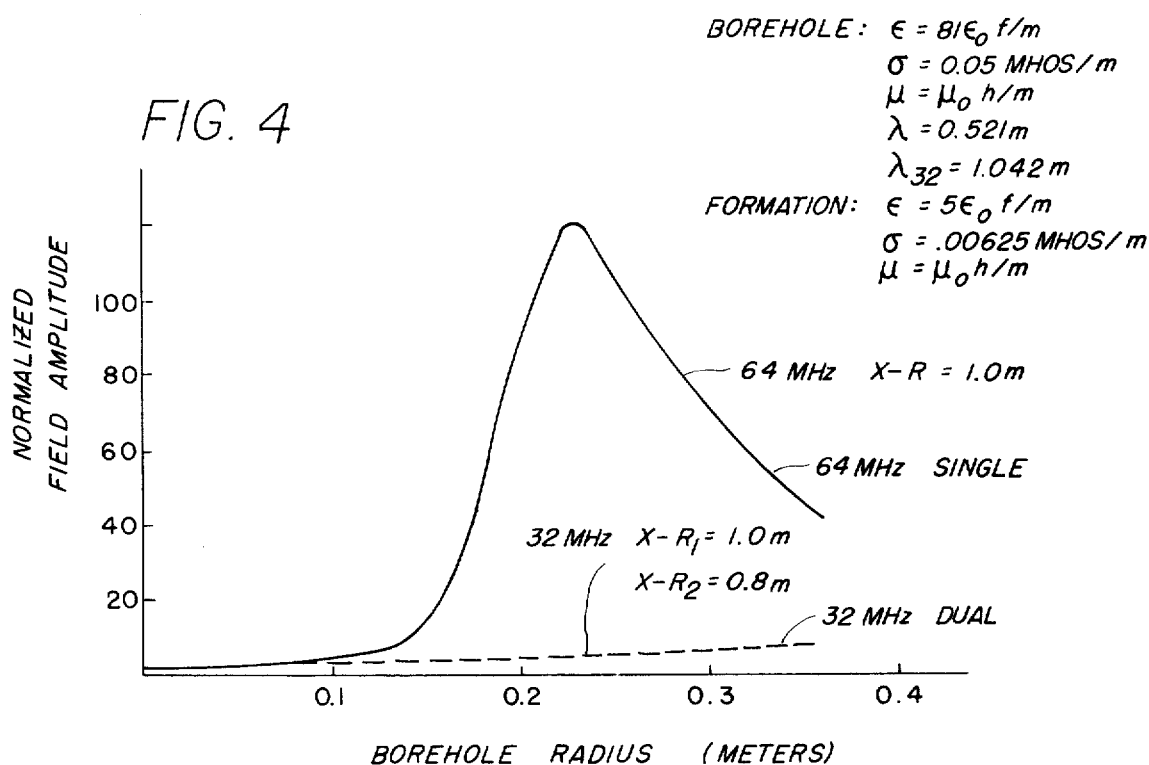
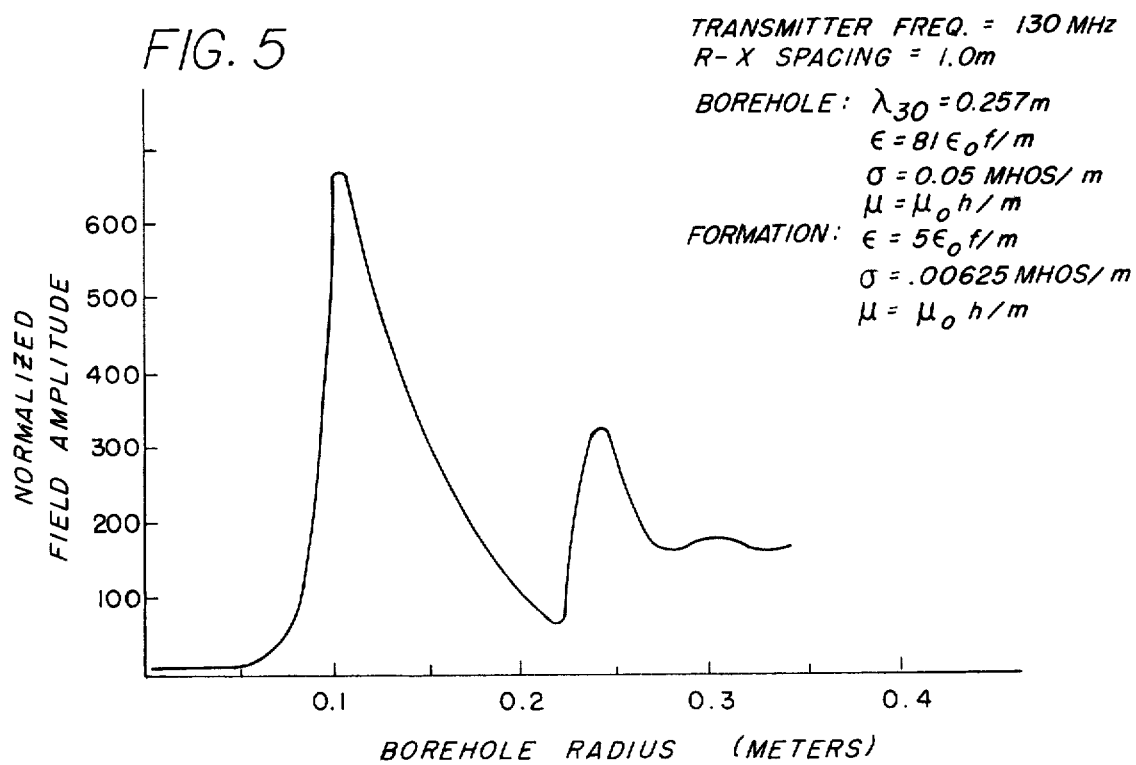

DIELECTRIC INDUCTION LOGGING SYSTEM FOR OBTAINING WATER AND RESIDUAL OIL SATURATION OF EARTH FORMATIONS

BACKGROUND OF THE INVENTION

This invention relates to methods and apparatus for determining the characteristics of materials surrounding a well bore, and more particularly, relates to methods and apparatus for radio frequency dielectric induction well logging wherein the formation resistivity, permittivity, water saturation and residual oil saturation are determinable by a means of in situ measurements taken in a well borehole.

For many years it has been conventional practice to log the electrical characteristics of earth formations in the vicinity of a well borehole in order to determine the location of oil bearing strata. This has been made possible in the past by the use of electrical resistivity logs in wells using highly conductive (low resistivity) drilling fluid and by the use of induction well logs in wells drilled with oil base drilling muds or drilling fluids having higher resistivities. In conventional resistivity logs a current emitting electrode or electrode array arranged for focusing the emitted current is used to emit either direct current or very low frequency (such as 60 hertz) alternating currents into the earth formation surrounding the well borehole by means of contacting electrodes. These currents traverse a section of the earth formations and are detected at a current return electrode situated a spaced distance from the current emitting electrode. The magnitude of the detected currents can then provide an indication of the resistivity of the earth formations surrounding the well bore. In some cases current electrodes are used in conjunction with measuring potential electrodes to determine the formation resistivity.

In electrical induction logging it has been conventional practice in the past to provide a well logging sonde having a transmitting coil (or array) disposed thereon and a receiver coil (or array) at a spaced distance therefrom. Generally a high frequency alternating electric current is passed through the transmitter coil (normally at a frequency of approximately 20 kilohertz). The resulting electric fields produced from this high frequency alternating current in the earth formations surrounding the well bore are detected at the spaced receiver coil by sensing the induced currents or voltages in the receiver coil.

In both of these types of prior art resistivity (or conductivity) logging systems for usefulness of the system arises from the fact that earth formations having pore spaces therein filled with hydrocarbon molecules exhibit a higher resistivity than those earth formations having the pore spaces therein filled with either salt water or some other conducting fluid.

Various problems have arisen in the interpretation of either conventional induction logging records or resistivity logging records of wells in areas where fresh water (relatively nonconductive such as less than 10,000 parts per million sodium chloride) are encountered. Such fresh water bearing sands or earth formations exhibit high resistivities (or low conductivities) much the same as those encountered in hydrocarbon bearing formations. In these cases it is difficult, if not impossible, to distinguish on the basis of the electric or induction well logging data alone whether an earth formation which is a prospective producing zone contains fresh water or hydrocarbon. It would therefore be very beneficial to provide a well logging system which on the basis of a single measurement of some of the physical characteristics of the earth formations in the vicinity of a well borehole could distinguish between fresh water bearing and hydrocarbon bearing earth formations. Such a system is provided in copending application Ser. No. 391,900, filed Aug. 27, 1973, which is assigned to the assignee of the present invention for a two frequency induction dielectric well log. The present invention uses the induction dielectric logging techniques of this aforementioned application but rather than operating at two different frequencies, makes measurements at two different effective depths of investigation at the same frequency. By appropriately combining porosity information and the two amplitude measurements made at the different effective depths of investigation according to the concepts of the invention, residual oil saturation and water saturation of the earth formations may be determined.

BRIEF DESCRIPTION OF THE INVENTION

In the well logging system of the present invention a downhole well logging sonde is provided which contains two different radio frequency dielectric measurement apparatuses. One radio frequency dielectric induction logging apparatus comprises a 30 megahertz transmitting apparatus together with a spaced single coil receiving apparatus. The second radio frequency dielectric induction logging apparatus comprises a focused dual coil 30 megahertz receiving apparatus and uses the same transmitting coil which is used with the other 30 megahertz transmitting apparatus. At this radio frequency the physical characteristics of the earth formations surrounding the well bore which influence the high frequency alternating currents induced in these formations by the transmitting apparatus include both the dielectric constant (or permittivity) of the earth formations together with the conductivity (or resistivity) characteristics of the earth formations in the vicinity of the borehole. By measuring the amplitude of the received signal at each of these two different receiver configurations, both the permittivity characteristics and the resistivity characteristics of the earth formations in the vicinity of the borehole may be determined. Novel apparatus for performing these amplitude measurements at the radio frequency is provided together with means for interpreting the measured amplitudes at these two different effective depths of investigation to derive the resistivity and the permittivity of the earth formations. When combined with porosity information the residual oil saturation and water saturation may be determined.

The novel concepts of the present invention are pointed out with particularity in the appended claims. The invention is best understood by reference to the following detailed description thereof when taken in conjunction with the accompanying drawings in which:

BRIEF DESCRIPTION OF THE DRAWINGS

FIGS. 3a and 3b are graphical illustrations relating porosity and water saturation and porosity and residual oil saturation as functionally related to the relative permittivity of the matrix material of earth formations;

FIG. 4 is a theoretically derived graph illustrating the amplitude variation of a 64 megahertz single source radio frequency induction sonde for borehole diameters from 0 to .35 meters; and FIG. 5 is a theoretically derived graph illustrating the amplitude variation of a 130 megahertz single source radio frequency induction sonde for borehole diameters from 0.0 to 0.4 meters.

DETAILED DESCRIPTION OF THE INVENTION

Figure 1:
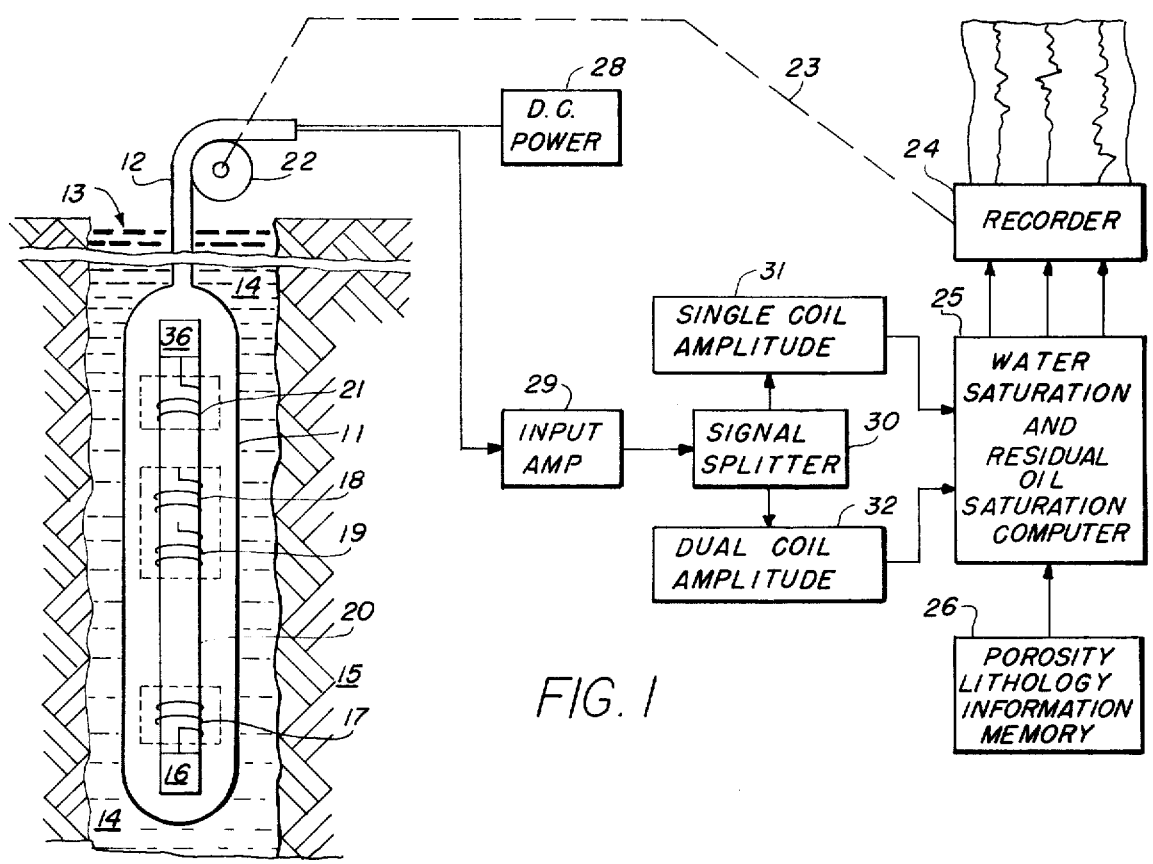
FIG. 1 is a block diagram illustrating the overall layout of a radio frequency induction dielectric logging system in accordance with the present invention.

Induction and electrical resistivity logs have proven useful in the past in determining earth formation resistivity and thereby locating oil bearing sands in the vicinity of a well borehole. However, due to the fact that fresh water sands and oil sands have similar high resistivities these logs (conventional induction and resistivity) cannot adequately detect the difference between oil and fresh water filling the pore spaces of the earth formations in the vicinity of the borehole. At radio frequencies, however, the possibility of measuring both the formation electrical conductivity and formation permittivity can provide a means for distinguishing these types of liquid bearing strata. Hydrocarbons have a characteristically low dielectric constant $\epsilon_r$, less than 5. On the other hand fresh water has a relatively high dielectric constant $\epsilon_r$, approximately equal to 80. The permittivity of a material $\epsilon$, is defined as the natural electrical polarization of this material. In this description the terms relative permittivity and dielectric constant $\epsilon_r$ will be used synonymously. These quantities are related to the permittivity of free space $\epsilon_0$ by the relationship given in Equation 1:

$$\epsilon = \epsilon_r \epsilon_0 \quad (1)$$

where $\epsilon_0 = 8.854$ picofarads per meter, the permittivity of free space.

From electromagnetic field theory, and in particular from the theory of a point source oscillating magnetic dipole, the behavior of radio frequency fields in the vicinity of a cylindrical borehole may be expressed as in Equation 2 (the Helmholtz Equation in conventional cylindrical coordinates $\rho$, $\phi$, and z)

$$\left[ \frac{1}{\rho} \frac{\delta}{\delta\rho} \left( \rho \frac{\delta}{\delta\rho} \right) + \frac{1}{\rho^2} \frac{\delta^2}{\delta\phi^2} + \frac{\delta^2}{\delta z^2} + K^2 \right] \pi_z^{(m)} = \frac{-j}{\omega\mu} I^{(m)} \frac{\delta(\rho)\delta(z)}{\rho} \quad (2)$$

here $\pi_z^{(m)}$ is the hertz magnetic vector; $I_{(m)}$ the magnitude of the current; and $j = \sqrt{-1}$. K is the complex wave number given by Equation 3:

$$K^2 = \omega^2 \mu \epsilon + j\omega\mu\sigma \quad (3)$$

In Equation 2, $\delta_{(\rho)}$ and $\delta_{(z)}$ are unit impulse functions of the dirac type.

$$\omega = 2\pi f$$

where $f$ is the frequency of oscillation of the point magnetic dipole.

$\epsilon$ is the electric permittivity of the media.

$\mu$ is the magnetic permittivity of the material surrounding the magnetic dipole and $\sigma$ is the electrical conductivity of the medium.

It will be observed that there are three physical constants associated with the material surrounding the oscillating point magnetic dipole in the above equations. These are the relative magnetic permeability $\mu$, the electrical permittivity $\epsilon$, and the electrical conductivity $\sigma$. For most earth formations at the frequencies of interest (10 to 60 megahertz) with respect to the present invention the relative magentic permeability $\mu$ may be taken as a constant. Variations in $\mu$ in the earth materials of interest generally fall in the range of 0.001 to .1 percent. Thus, only the two media constants contributing a significant variation from one earth material to another at the frequencies of interest are $\epsilon$ and $\sigma$. These two physical characteristics have a direct effect on any very high frequency alternating electrical current flowing in the media. Both of these physical properties of the media have an effect on the magnitude and the base with respect to the transmitter of these induced or eddy currents in formations in the vicinity of a well borehole. Assuming a point magentic source placed in a cylindrical borehole and responding to the Helmholtz equation, the total field is defined as the field of the source which is sensed by a receiver coil in any medium. The total field may be separated into a primary field and a secondary field. The primary field is defined to be the field of the source which is sensed by the receiver coil in some reference medium (such as vacuum or air). The secondary field is defined as the field which when added vectorially to the primary field, results in the total field. The primary field has an amplitude and a phase which are equal to the amplitude and phase of the total field in the reference medium. When the source is placed in a medium which is different from the reference medium, the secondary field adds vectorially to the primary field to produce the total field within the new medium. The primary field serves as an amplitude and phase reference for the determination of the secondary field.

The currents that flow in the medium surrounding the oscillating point magnetic dipole are called eddy currents. The eddy currents generate secondary fields, which in the case of a highly conductive medium, act to oppose the primary or reference field. However, when we (the angular operating frequency multiplied by the electrical permittivity) approaches the magnitude of $\sigma$ (the electrical conductivity) the eddy currents are phase shifted and may actually result in secondary fields which increase the magnitude of the total field. This is commonly the case when operating at the frequencies of interest in the present invention which generally may be stated to comprise radio frequencies from 10 to 60 megahertz.

Since changes in both $\epsilon$ and $\sigma$ effect changes in the eddy currents at any given frequency, the measurement of a single amplitude cannot separate the two effects. However, in accordance with the principles of the present invention, the measurement of the amplitude of the total field at two different effective radial depths of investigation by different receiver coil configurations may be combined to simultaneously determine resistivity and permittivity of the formation. If additionally the porosity of the formation is known, then residual oil saturation and water saturation may also be found. Other techniques may also be used for this purpose but will not be discussed here.

The Helmholtz equation (Equation 2) is valid in any cylindrical layer of a layered medium surrounding the point magnetic dipole in the borehole. By use of a computer program to perform numerical integration of the solutions of Equation 2 in various cylindrical layers about such a point magnetic dipole and by applying boundary conditions at the interface of these regions and at the source, the total field at a receiver coil or configuration of multiple receiver coils displaced a distance z, along the borehole axis from the point magnetic dipole may be derived.

Through studies of the numerical solution of the Helmholtz equation, (Equation 2) in boreholes of various diameters, graphical representation of the amplitude of the field at a receiver coil as a function of the borehole diameter for various different size boreholes may be made. Such a graphical representation is shown in FIG. 4 for a 64 megahertz single coil transmitter and receiver system and for a 32 megahertz dual coil transmitter and single coil receiver system. It will be observed, of course, that due to the reciprocity therein, this result would be the same for a dual coil receiver and single coil transmitter. It can be observed in FIG. 4 that at a frequency of 64 megahertz what appears to be an anomalous resonance effect occurs at a borehole radius of about 10 inches. It can also be observed that the 32 megahertz dual transmitter coil amplitude response does not exhibit this type of resonance effect for reasonably sized boreholes. This provides an advantageous choice of operating frequency of 30 megahertz for the present invention.

Referring now to FIG. 5, a graphical representation illustrating the normalized total field amplitude at a receiver coil on the z axis of the borehole as a function of the borehole radius for an operating frequency of 130 megahertz is illustrated. In this case the anomalous resonance effect is exhibited at a borehole radius of about 0.1 meters (four inches) and again at a borehole radius of 0.25 meters (about 10 inches). Thus, if it were attempted to measure the dielectric and conductivity properties of the materials surrounding the wellbore at frequencies as high as 64 megahertz, it is apparent from the graphical representations of FIGS. 4 and 5 that some correction would possibly be needed for these resonance effects. On the other hand, it will be remembered that in order to determine both the electrical conductivity and the permittivity (or dielectric constant) of the materials surrounding the well bore, measurements must be made of the amplitude of the received signal at least at two different effective depths of investigation in order to interpret the resulting amplitude measurements in terms of both the permittivity and the conductivity $\sigma$ of the earth formation surrounding the borehole. In order to avoid resonance effects such as those depicted in FIGS. 4 and 5, in the present invention amplitude measurements of the total field signals at a single receiver coil situated in the borehole at a first spaced distance from the transmitter and at a dual receiver coil pair spaced at a second, different distance from the transmitter are made at an operating frequency of 30 megahertz. The different distances of the two receivers and the focusing effect of the dual receiver coil pair provides two different radial depths of investigation for the measurements.

Referring now to FIG. 1, a dual receiver induction dielectric well logging system in accordance with the concepts of the present invention is illustrated schematically. A well logging sonde 11 whose main body member is preferably constructed of fiber glass or some other nonconducting material of sufficient strength characteristics, is shown suspended by a well logging cable 12 in an uncased well borehole 13. The borehole 13 is filled with a borehole fluid 14 and is surrounded by earth formations 15 whose permittivity and conductivity properties are to be measured.

The lower portion of the well logging sonde 11 is seen to be basically comprised of a transmitter electronics section 16 and an associated transmitting coil 17. The transmitting coil 17 is wound about a central strength member or mandrel 20. This mandrel 20 is also preferably comprised of a nonconducting material. The transmitter coil 17 is operated at a frequency of 30 megahertz and will be described in more detail subsequently. Dual receiver coils 18 and 19 which are helically wound on mandrel 20 in opposite directions to produce a reversed polarity pair and comprise a focused or dual coil receiver which is sensitive at a frequency of 30 megahertz. A single receiver coil 21 is spaced axially along the axis of the sonde 11 from the transmitter coil 17 and is situated approximately 42 inches from the center of 30 megahertz transmitter coil 17. The receiver coil 21 is situated approximately 36 inches from the midpoint of the 30 megahertz receiver coil pair 18 and 19 whose centers are spaced apart by approximately 8 inches. It will be appreciated by those skilled in the art that while these transmitter to receiver coil spacings have been found useful in practicing concepts of the present invention, that they are intended as being illustrative only. It may be entirely practical to utilize other than the disclosed spacing distances between the transmitting and receiving coils and other coil spacings are considered to be within the scope of the invention.

The radial depth of investigation of the induction dielectric logging system of the present invention is influenced by the spacing distance between the transmitting and receiving coils. In general the longer the spacing between the transmitter and receiver coil, the deeper the radial depth of investigation into the earth formations in the vicinity of the borehole. However, it will be appreciated that it is necessary to space the transmitter and receiver coils close enough together to assure reception of a usable signal level from earth formations having various conductivity and dielectric properties. As a highly conductive material adjacent to the borehole will attenuate signals at the radio frequencies used in practicing the present invention substantially, then it would be required to utilize a higher transmitting power as the distance between the transmitter and receiver coils is increased.

A conventional winch arrangement (not shown) at the surface is used for moving the sonde 11 through the borehole during the well logging operation. The sheave wheel 22 over which cable 12 passes may be electrically or mechanically linked to a data recorder 24 which is used to record processed signals from the downhole sonde 11 as a function of its depth in the borehole 13. Power for operation of the down hole receiver electronics 36 is provided on conductors of the well logging cable 12 by a surface power source 28. Electrical measurement signals detected by the receiver electronics portion 36 of the logging tool 11 are amplified by an input amplifier 29 and supplied to signal processing circuitry to be described subsequently.

Receiver output signals from the downhole electronics 36 generally may be considered as being comprised of two amplitude measurements which are transmitted on the cable 12 conductors and separated at the surface by frequency discrimination. That is to say the amplitude information from one 30 megahertz receiver is sent up the cable 12 at a first intermediate frequency $f_1$ while the amplitude information from the second, different spaced receiver is sent up the cable 12 conductor at a second intermediate frequency $f_2$.

Considering first the signal splitter 30, the dual intermediate frequency input signal from the well logging cable 12 is amplified by an input amplifier 29 and supplied to a signal splitter circuit 30. Signal splitter circuit 30 may comprise relatively high Q frequency filtering means, for example, which divides the signal into its two component intermediate frequencies $f_1$ and $f_2$. The signal at frequency $f_1$ is supplied to a single coil amplitude detector circuit 31. The dual coil amplitude detector 32 detects the amplitude information sensed at the intermediate frequency $f_2$. These two amplitude signals are supplied as inputs to a water saturation and residual oil saturation computer 25 whose function will be described in more detail subsequently. For further detailed description of the downhole circuitry 36 in the sonde 11 and the data transmission system including signal splitter 30 and amplitude detectors 31 and 32, reference is made to the aforementioned copending application.

The armored cable contemplated for use in the present invention comprises a triaxial well logging cable consisting (from the outside - in) of an outer armor shield, an insulation layer, a coaxial cable shielding layer, a second insulation layer and a center conductor, as shown in the aforementioned copending application. While the logging system of the present invention is preferably operated from this type of well logging cable, it will be appreciated by those skilled in the art that other types of multiconductor armored well logging cable as known in the art could be used if desired.

Figure 2:
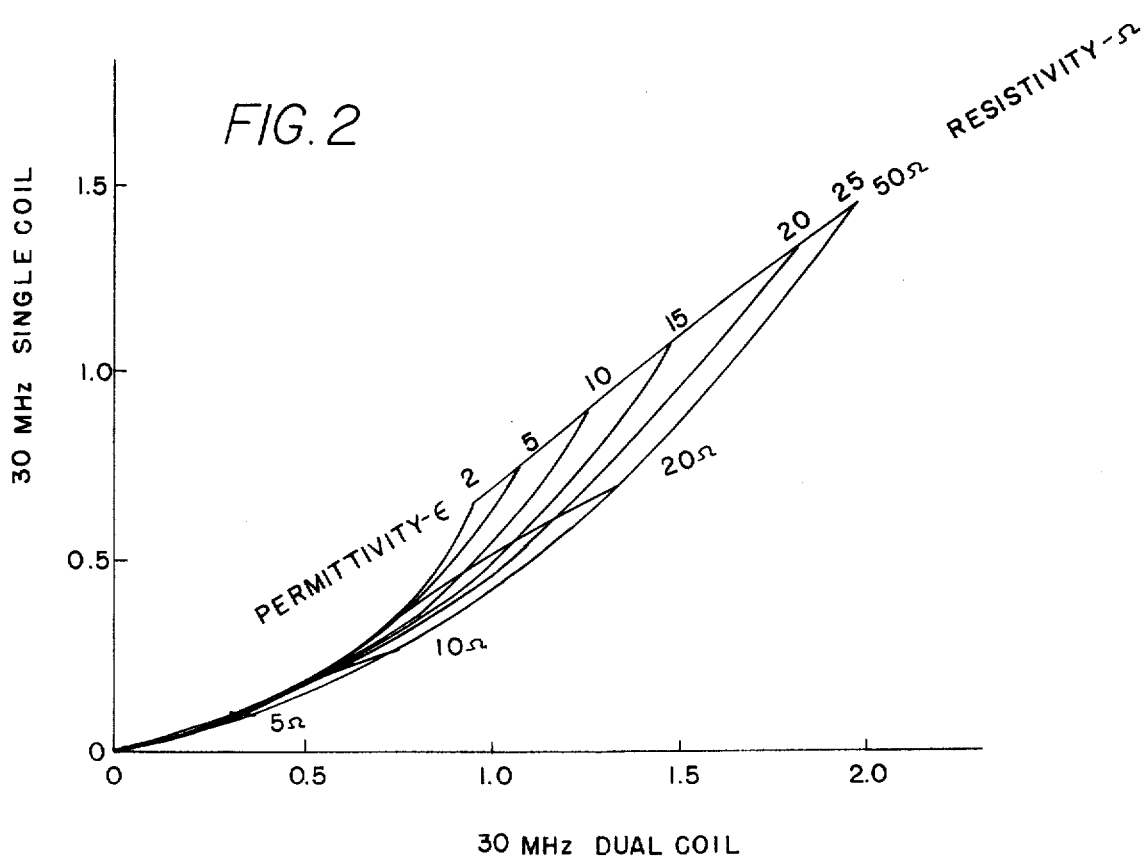
FIG. 2 is a theoretically derived cross plot of the amplitude response of the two receiver configuration systems of FIG. 1 showing the response of this system for a range of formation permittivity and resistivity values.

Referring now to FIG. 2, a theoretically derived graph of the response of a well logging system such as that described when embedded in a homogeneous medium is shown in graphical form. The normalized field amplitudes of the signals received at the dual receiver coils due to the 30 megahertz transmitter is plotted on the absissa while the ordinate contains a plot of the normalized field amplitude of the 30 megahertz single coil received signal. By normalized it is meant here that the received signals are normalized to their corresponding value in air. That is to say, the amplitude of the signal received at a frequency of 30 megahertz at the dual receiver coils in air is divided into the total field received at the dual receiver coils in the formation due to the 30 megahertz transmitted signal. Similarly the signal received at 30 megahertz at the single receiver coil in the formation is divided by the amplitude of the 30 megahertz single coil signal received in air.

The curves of FIG. 2, it should be observed, are a function of both the conductivity and dielectric properties of the homogeneous medium in which the well logging sonde is considered to be embedded for the purposes of the graphical representation.

It will be appreciated that by making normalized total field amplitude measurements at the two different receivers as disclosed with respect to the apparatus of FIG. 1, and by then referring to a cross plot of theoretically derived values for these amplitudes such as those illustrated in FIG. 2 that a unique value for both the conductivity and permittivity of the material surrounding the borehole may be derived. This combination of two amplitude measurements is performed in the water saturation and residual oil saturation computer 25 of FIG. 1. The computer 25 may comprise a small general purpose digital computer such as the model PDP-12 computer made by the Digital Equipment Corporation of Cambridge, Massachusetts, or the like.

Figure 3B:
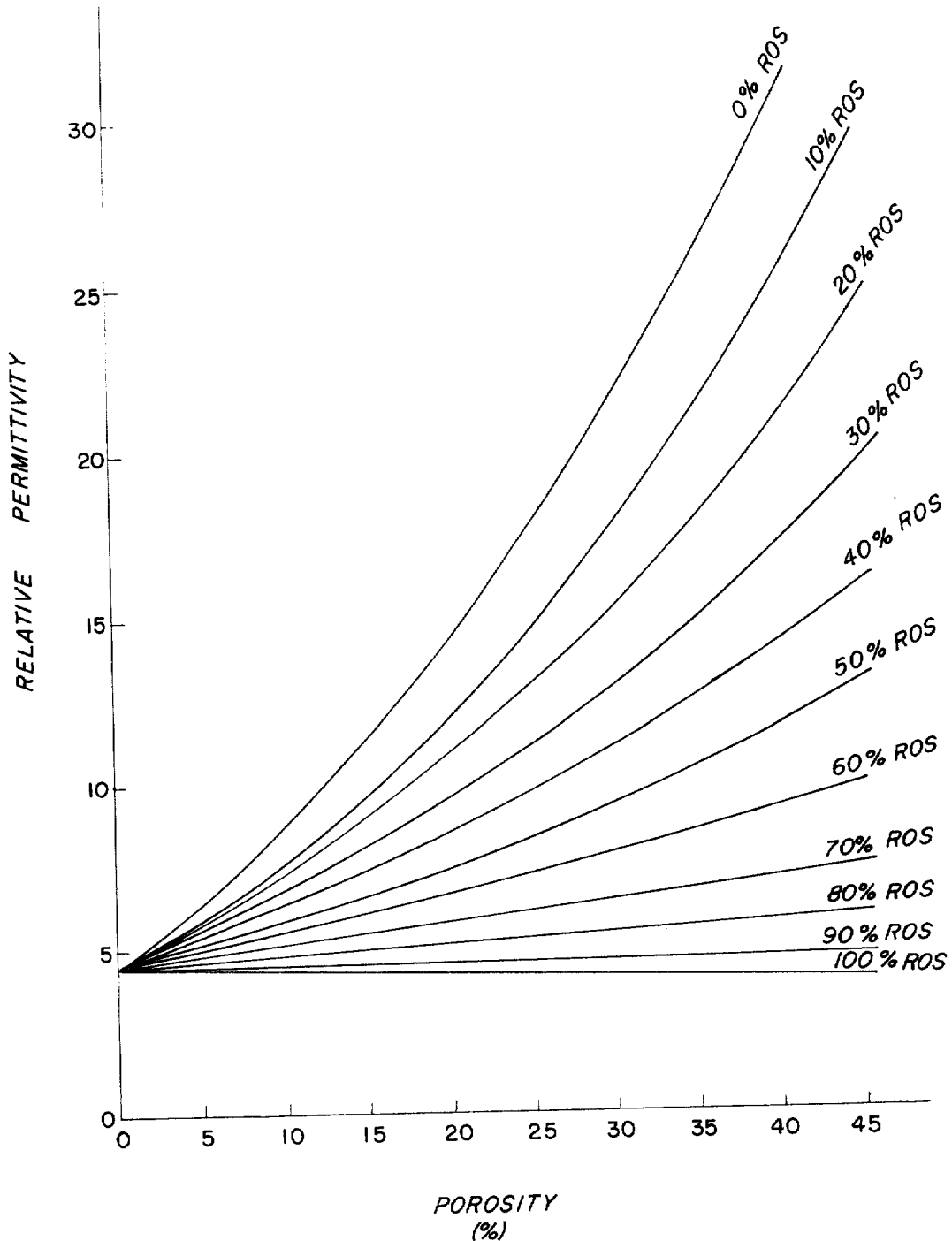

Graphical representation of the type shown in FIGS. 2, 3a and 3b can be placed in tabular form in the memory of a small general purpose digital computer such as the computer 25 of FIG. 1. These representations may then be used to derive the resistivity and permittivity of the earth formations in the vicinity of the well borehole directly from the two amplitude measurements of the normalized total field received at the two receivers. The small general purpose digital computer 25 may be readily programmed to make these computations when supplied with information such as the borehole diameter and dielectric characteristics of the drilling fluid, which are known beforehand. Conventional interpolation and curve fitting techniques such as least squares may be used for this purpose. The programming of such techniques in a commonly used computer language such as FORTRAN would be apparent to one skilled in the art when supplied with the graphical information relating these amplitude measurements to the dielectric and conductivity characteristics of the earth formations in the form of the information contained in FIGS. 2, 3a and 3b. Aternatively, the well logging system of FIGS. 1-3 can be calibrated in test boreholes having formations of known characteristics. The resulting calibration curves (similar to those of FIGS. 2, 3a and 3b) can then be used in a similar manner in computer 25.

It is highly desirable to be able to quantitatively obtain the water saturation $S_w$ and the residual oil saturation ROS of earth formations in the vicinity of the borehole. The graphical representations of FIG. 3a illustrate the permittivity of the formation plotted as a function of porosity for different water saturations in sandstone and limestone lithologies. If the porosity value of the earth formation is known, for example from a previously made neutron-gamma ray log or a sonic log, this information may be stored in a memory device such as porosity-lithology memory 26 of FIG. 1. Memory device 26 could, for example, comprise a magnetic tape unit attached to computer 25 of FIG. 1. Thus, once the two amplitude measurements have been combined as previously described to obtain the formation permittivity, the relationship of FIG. 3a may be employed together with the porosity information input from memory 26 in order to obtain the water saturation $S_w$ of the formation as a function of depth.

Similarly, with respect to FIG. 3b, the permittivity of sandstone formations as a function of porosity for several different residual oil saturations is illustrated graphically. Once the relative permittivity is obtained by combining the two amplitude measurements in computer 25 as described, the relationship of FIG. 3b may be employed together with porosity information input from memory 26 in order to obtain a quantitative estimate of ROS. A similar graphical relationship to FIG. 3b can be obtained for limestone formations and employed similarly in this lithology.

The above description may make other alternative embodiments of the invention apparent to those skilled in the art. It is therefore the aim of the appended claims to cover all such changes and modifications as fall within the true spirit and scope of the invention.

The embodiments of the invention in which an exclusive property or privilege is claimed are defined as follows:

1. A method for determining the characteristics of earth formations in the vicinity of a well borehole comprising the steps of:
   generating, in a well borehole, a radio frequency electromagnetic field in the frequency range from 10 to 60 megahertz;
   detecting, at a first spaced distance in the borehole, the total field amplitude of the electromagnetic field at said generated frequency this amplitude being influenced by earth formation materials at a first effective depth of investigation;
   detecting, at a second spaced distance in the borehole, the total field amplitude at said generated frequency this amplitude being influenced by earth formation materials at a second, different, effective depth of investigation; and
   combining said total field amplitude measurements having different effective depths of investigation according to a predetermined relationship to derive an indication of the earth formation conductivity and permittivity at said generated frequency.

2. The method of claim 1 and further including the steps of:
   determining the porosity of the earth formations in the vicinity of the borehole; and
   combining said porosity determination and said permittivity indication according to a predetermined relationship to derive an indication of the water saturation $S_w$ of the earth formations.

3. The method of claim 2 wherein all of said steps are performed repetitively at a plurality of depths in the borehole and said conductivity, permittivity, and water saturation are recorded as a function of borehole depth.

4. The method of claim 1 and further including the steps of:
   determining the porosity of the earth formations in the vicinity of the borehole; and
   combining said porosity determination and said permittivity indication according to a predetermined relationship to derive an indication of the residual oil saturation ROS of the earth formations.

5. A method of claim 4 wherein all of said steps are performed repetitively at a plurality of depths in the borehole and said conductivity, permittivity and residual oil saturation are recorded as a function of borehole depth.

6. The method of claim 1 and further including the steps of:
   determining the porosity of the earth formations in the vicinity of the borehole;
   combining said porosity determination and said permittivity indication according to a first predetermined relationship to derive an indication of the water saturation $S_w$ of the earth formations; and
   combining said porosity determination and said permittivity indication according to a second predetermined relationship to derive an indication of the residual oil saturation ROS of the earth formations.

7. The method of claim 6 wherein all of said steps are performed repetitively at a plurality of depths in the borehole and said conductivity, permittivity, water saturation $S_w$ and residual oil saturation ROS are recorded as a function of borehole depth.

8. The method of claim 1 wherein the step of detecting the total field amplitude of said electromagentic field at said first spaced distance is performed by detecting said total field amplitude with a dual coil detecting means.

9. The method of claim 8 wherein the step of detecting the total field amplitude of said electromagnetic field amplitude of said electromagnetic field at said second spaced distance is performed with a single coil detecting means.

10. The method of claim 9 wherein said predetermined relationship used to derive an indication of the conductivity and permittivity of the earth formations comprises a predetermined calibrated functional relationship between the response of said single and said dual coil receiving means.

11. A method for determining the characteristics of earth formations in the vicinity of a well borehole, comprising the steps of:
   deriving in a well borehole a first signal indicative of a function of earth formation conductivity and permittivity at a first effective depth of investigation into earth formations at a radio frequency in the range of 10 to 60 megahertz;
   deriving in a well borehole a second signal indicative of a function of earth formation conductivity and permittivity at a second effective depth of investigation at the same radio frequency used in deriving said first signal; and
   combining said first and second signals according to a predetermined relationship to derive indications of the conductivity and permittivity of the earth formations.

12. The method of claim 11 and further including the steps of:
   deriving an indication of the porosity of earth formations in the vicinity of the borehole; and
   combining said porosity indication and said permittivity indication according to a predetermined relationship to dervie an indication of the water saturation $S_w$ of the earth formations.

13. The method of claim 12 wherein all of said steps are performed repetitively at a plurality of depths in the borehole and said conductivity, permittivity and water saturation are recorded as a function of borehole depth.

14. The method of claim 11 and further including the steps of:
   deriving an indication of the porosity of the earth formations in the vicinity of the borehole;
   combining said porosity indication and sai permittivity indication according to a predetermined relationship to derive an indication of the residual oi saturation ROS of the earth formations.

15. The method of claim 14 wherein all of said step ae performed repetitively at a plurality of depths in the borehole and said conductivity, permittivity and residual oil saturation are recorded as a function of borehol depth.

16. The method of claim 11 and further including th steps of:
   deriving an indication of the porosity of earth forma tions in the vicinity of the borehole;

combining said porosity indication and said permittivity indication according to a first predetermined relationship to derive an indication of water saturation $S_w$ of the earth formations; and combining said porosity indication and said permittivity indication according to a second predetermined relationship to derive an indication of the residual oil saturation ROS of the earth formations.

17. The method of claim 16 wherein all of said steps are performed repetitively at a plurality of depths in the borehole and said indications of conductivity, permittivity, water saturation $S_w$ and residual oil saturation ROS are recorded as a function of borehole depth.

* * * * *